United States Patent [19]

Nonnweiler et al.

[11] Patent Number: 4,847,765
[45] Date of Patent: Jul. 11, 1989

[54] HYBRID INTERRUPT HANDLING FOR COMPUTER-CONTROLLED IMAGING SYSTEM

[75] Inventors: Edward D. Nonnweiler, Milwaukee, Wis.; Richard B. Leavell, Pembrooke, Fla.

[73] Assignee: General Electric Company, New York, N.Y.

[21] Appl. No.: 944,653

[22] Filed: Dec. 22, 1986

[51] Int. Cl.$^4$ .............................................. G06F 15/42
[52] U.S. Cl. .................................. 364/413.13; 128/277
[58] Field of Search .......................... 364/414; 128/777

[56] References Cited

U.S. PATENT DOCUMENTS

| | | | |
|---|---|---|---|
| 4,491,932 | 6/1985 | Ruhman | 364/414 |
| 4,494,141 | 6/1985 | Altekruse | 364/414 |
| 4,578,767 | 3/1986 | Shapiro | 364/414 |
| 4,694,398 | 9/1987 | Croteau | 364/414 |

Primary Examiner—Jerry Smith
Assistant Examiner—Gail O. Hayes
Attorney, Agent, or Firm—Thomas R. Morrison

[57] ABSTRACT

An exposure control module for an X-ray imaging system includes a timing and sequence controller communicating with external elements of the system on a parallel data bus. The timing and sequence controller employs a plurality of stored recipes for advancing the system through a selected mode of operation. Changes in certain of the external signals on the parallel data bus may be recognized by an interrupt handler to transfer the attention of the system. The amount of hardware required for recognition of a significant change is reduced by converting a sample of the bus data into a plurality of sets of parallel data, and storing each set in separate multiplexers. A further plurality of sets of data from a preceding sample are applied to a corresponding further set of multiplexers. The serial data in corresponding pairs of present-status and previous-status multiplexers is read out in parallel to a logic array. The logic array also receives mask signals effective to enable or inhibit selectively the recognition of positive-going and negative-going changes in the data from sample to sample. When an enabled change is detected, an interrupt is generated. The actual bus signal conditions are compared with desired bus signal conditions. Once coincidence between the actual and desired conditions is achieved, a recipe process is executed.

5 Claims, 5 Drawing Sheets

HYBRID INTERRUPT HANDLING FOR COMPUTER-CONTROLLED IMAGING SYSTEM

BACKGROUND OF THE INVENTION

The present invention relates to imaging systems and, more particularly, to techniques for detecting and responding to a plurality of interrupts occurring in real time.

Modern imaging systems such as, for example, X-ray imaging systems, are operated under control of a digital computer for performing a complex sequence of control activities required to produce a desired image while minimizing human exposure to X radiation and avoiding damaging operating parameters on the X-ray equipment. The imaging modes may be, for example, simple two-dimensional exposure, computer axial tomographic three-dimensional exposure, or cine exposure. Each of these modes requires a different control sequence. Preferably, operation of the imaging equipment is changeable from mode to mode upon an operator's command.

In one type of X-ray imaging equipment, the sequence of operations is controlled by recipes detailing the activities required and the preconditions enabling advance to a subsequent activity. For example, before an X-ray tube is called on to produce radiation, confirmation is required that its voltages are at predetermined levels and that its anode rotation apparatus is up to speed.

Data representing commands and data representing responses of the system to the commands or external conditions is transmitted between system elements on a high-speed parallel data bus. Some of the data items are of such importance that they require immediate attention by the system. Such important data must be recognized by the system for the generation of an interrupt. In response to the interrupt, the central processor pauses its current task to pursue the higher-priority task represented by the interrupt. Once the higher-priority task is completed, the processor may return to the interrupted task or, in some instances, it may be commanded to jump to a completely different task, abandoning the original task.

In order to sense the data conditions requiring an interrupt, the parallel data bus is sampled at a frequency high enough to attain the required responsiveness. One of the problems the present invention addresses is a technique for attaining the required responsiveness without excessive cost.

A system condition capable of generating an interrupt in one mode may be irrelevant in a different mode or different portion of the same mode. Thus, data patterns on the parallel data bus are necessarily passed through a sieve, or mask, which accepts for the generation of interrupts only those conditions relevant to the current mode of operation.

OBJECTS AND SUMMARY OF THE INVENTION

It is an object of the invention to provide an interrupt-handling technique for an imaging system which overcomes the drawbacks of the prior art.

It is a further object of the invention to provide an interrupt-handling technique employing a change detector for sensing changes in data conditions between adjacent data samples.

It is a still further object of the invention to provide an interrupt-handling technique wherein data samples are checked against operation-specific masks before permitting the generation of an interrupt.

It is a still further object of the invention to provide an interrupt-handling technique wherein data on a parallel data bus in divided into a plurality of separate parallel subsections. The parallel data in all parallel subsections are simultaneously converted to respective streams of serial data and compared, bit-by-bit, with corresponding data from the last sample. A mask, applied to the data during the comparison, enables or inhibits the generation of an interrupt in response to a change in the data from that existing in the prior data sample in dependence on whether the change is one which the present mode permits to generate an interrupt.

Briefly stated, the present invention provides an exposure control module for an X-ray imaging system including a timing and sequence controller communicating with external elements of the system on a parallel data bus. The timing and sequence controller employs a plurality of stored recipes for advancing the system through a selected mode of operation. Changes in certain of the external signals on the parallel data bus may be recognized by an interrupt handler to transfer the attention of the system. The amount of hardware required for recognition of a significant change is reduced by converting a sample of the bus data into a plurality of sets of parallel data, and storing each set in a separate multiplexer. A further plurality of sets of data from a preceding sample are applied to a corresponding set of multiplexers. The serial data in corresponding pairs of present-status and previous-status multiplexers is read out in parallel to a logic array. The logic array also receives mask signals effective to enable or inhibit selectively the recognition of positive-going and negative-going changes in the data from sample to sample. When an enabled change is detected, an interrupt is generated. The actual bus signal conditions are compared with desired bus signal conditions when an interrupt is generated. Once coincidence between the actual and desired conditions is achieved, the recipe process is executed.

According to an embodiment of the invention, there is provided a hybrid interrupt handler for an imaging system, the imaging system including at least one parallel data bus carrying a plurality of signals, comprising: an exposure-control module, the exposure-control module including means for storing at least one recipe defining an operating sequence of the imaging system, transition detection means responsive to a change in at least one of the plurality of signals for producing an evaluate enable signal, and comparison means responsive to the evaluate enable signal for comparing a desired condition specified by the recipe with an actual condition of the plurality of signals and for producing a control signal in response to coincidence between the desired and actual conditions.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention may have general applicability to other imaging systems and to systems other than imaging systems. The following disclosure should be thus regarded. For concreteness, however, the description herein is given in the environment of an X-ray imaging system. It should also be clear that the term imaging system should be given its broadest interpretation.

Figure 1:
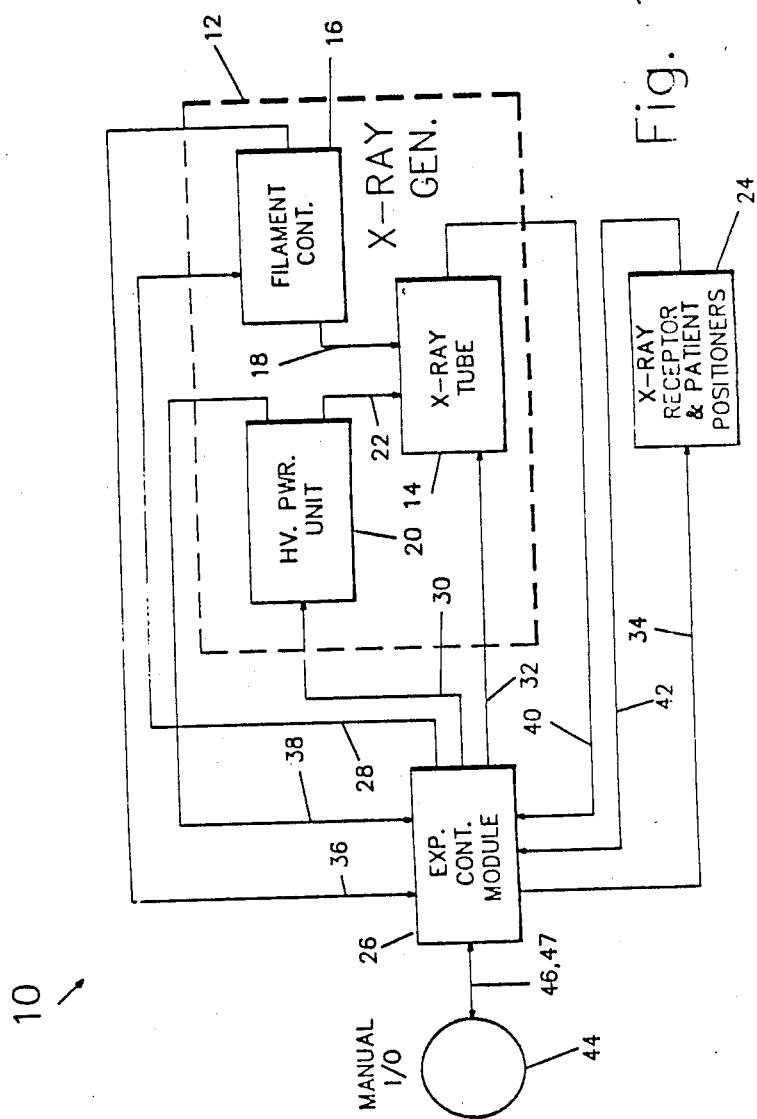
FIG. 1 is a simplified block diagram of an X-ray imaging system in which the present invention is incorporated.

Referring now to FIG. 1, there is shown, generally at 10, an X-ray imaging system in accordance with an embodiment of the invention. An X-ray generator 12 includes a conventional X-ray tube 14 whose filament power is controlled by a filament controller 16 as indicated by a line 18. A cathode voltage of X-ray tube 14 is controlled by a high-voltage power unit 20 as indicated by a line 22. An X-ray receptor and patient positioner 24 receives the X rays from X-ray generator 12 after they have been modified by a body (not shown) about which the X-ray process is intended to produce information. An exposure-control module 26 controls all functions in X-ray generator 12 and some functions in X-ray receptor and patient positioner 24, as indicated by line 28, 30, 32 and 34 connected from exposure-control module 26 to filament controller 16, high-voltage power unit 20, X-ray tube 14 and X-ray receptor and patient positioner 24, respectively. In addition, data responsive to conditions in filament controller 16, high-voltage power unit 20, X-ray tube 14 and X-ray receptor and patient positioner 24 is communicated therefrom to exposure-control module 26 on lines 36, 38, 40 and 42, respectively. Manual interaction with exposure-control module 26 is provided by a conventional manual input-output device 44 connected to exposure-control module 26 by lines 46 and 47.

For the high data rates required for system responsiveness, and particularly data from X-ray receptor and patient positioner 24, data communications represented by lines 28–42 are preferably performed on a parallel data bus wherein each of a plurality of conductors in the parallel data bus is dedicated to a single binary digit whose zero or one condition carries a predetermined piece of intelligence. Each of lines 28–42 may be a single conductor in the parallel data bus, or may be a plurality of conductors, as required to convey the required number of binary digits. In addition to the transmission of commands, lines 28–34 may also convey timing signals required in the elements to which they are connected for synchronizing activities therein with related activities elsewhere in the system.

X-ray generator 12 and X-ray receptor and patient positioner 24 should be considered to be general devices of any conventional type now known or later developed. These elements are important to the present invention because of the way the data flowing to and from them interacts with the apparatus of the present invention but, except for their data interaction with the remainder of the system, are not of interest to the present invention. Since they are fully conventional and well known to those skilled in the art, further detailed description thereof would be redundant and is omitted. As presently foreseen, the present invention may be devoted exclusively to the high-speed data needs of X-ray receptor and patient positioner 24. This should not be taken to indicate that the invention is thus limited.

Figure 2:
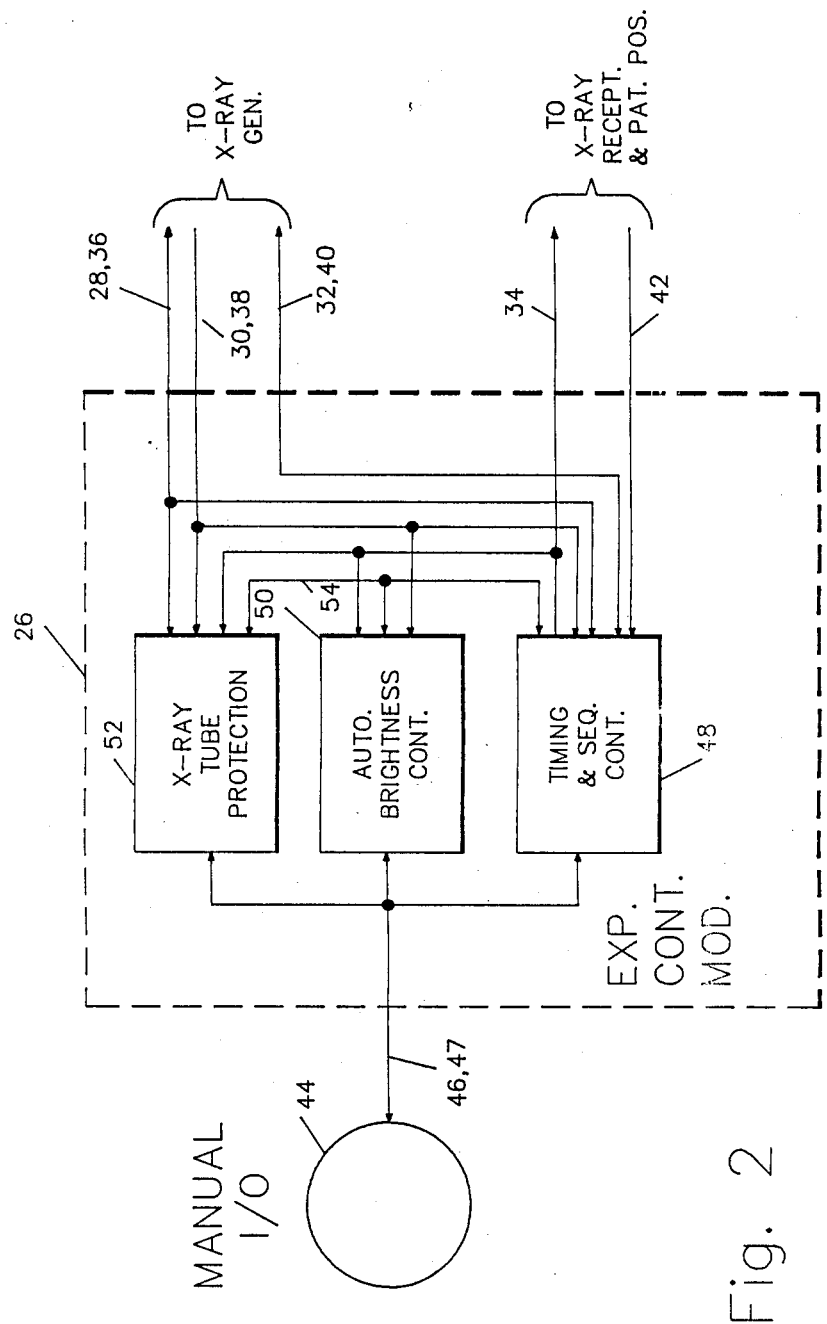
FIG. 2 is a simplified block diagram of an exposure control module of the X-ray imaging system of FIG. 1.

Referring now also to FIG. 2, exposure-control module 26 contains a timing and sequence control module 48, an automatic brightness control module 50 and an X-ray tube protection module 52. Automatic brightness control module 50 is generally conventional in its relationship with X-ray generator 12 and X-ray receptor and patient positioner 24, employing data incoming on lines 40 and 42 from X-ray generator 12 and X-ray receptor and patient positioner 24 to modulate control of X-ray tube 14 for maintaining a predetermined brightness of an image produced by X-ray receptor and patient positioner 24. All relevant data received by automatic brightness control module 50 is also placed on a parallel real-time bus 54 for communication to timing and sequence control module 48. Real-time bus 54 also carries data from timing and sequence control module 48 to automatic brightness control module 50, as well as to and from X-ray tube protection module 52.

X-ray tube protection module 52 also is generally conventional in enforcing the existence of predetermined conditions required to prolong the life of X-ray generator 12 and X-ray receptor and patient positioner 24 before permitting the generation of X rays from X-ray tube 14. Such predetermined conditions as, for example, the existence of a required filament temperature, a high voltage, or an anode rotation speed, may be established as preconditions for the generation of X rays. Signals containing information from which the existence or non-existence of such preconditions may be determined is transmitted to X-ray tube protection module 52 on lines 36, 38, and 40. Any relevant information transmitted directly to X-ray tube protection module 52 is also placed on real-time bus 54 for transmission to timing and sequence control module 48.

Since automatic brightness control module 50 and X-ray tube protection module 52 are generally conventional and would therefore be well within the knowledge of one skilled in the art, further description thereof is considered unnecessary.

Figure 3:
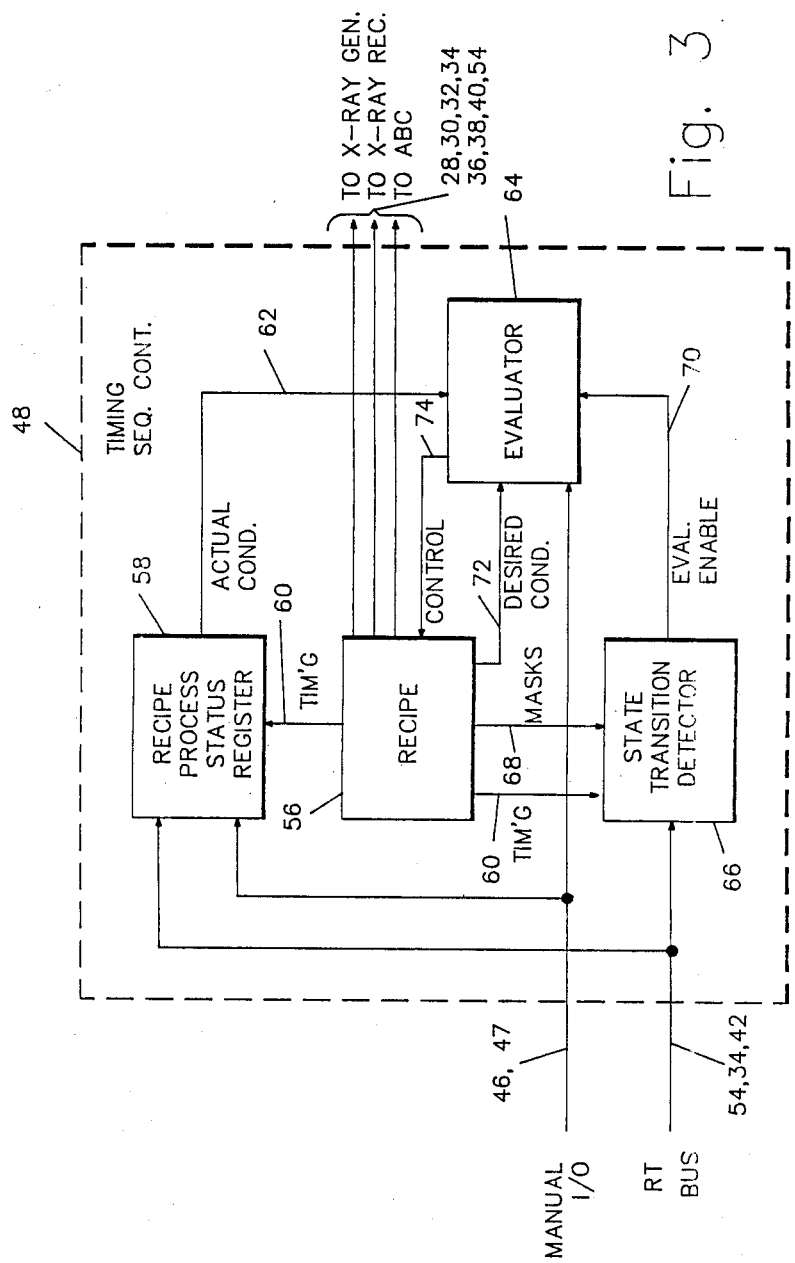
FIG. 3 is a block diagram of a timing and sequence control module of FIG. 2.

Referring now to FIG. 3, timing and sequence control module 48 includes a recipe generator 56 containing all of the procedures required for the operation of X-ray imaging system 10 as well as all of the rules for interrupts. A recipe process status register 58 receives manual control signals from line 46, as well as status signals from lines 54, 34 and 42. Based on these inputs, as well as timing signals on a line 60 from recipe generator 56, recipe process status register 58 maintains an up-to-date record of where the system is in the sequence making up the recipe being executed. A signal representing the existing actual condition is connected on a line 62 to an evaluator 64.

All external data is connected in parallel to a state transition detector 66. It is the basic strategy of state transition detector 66 to sample its inputs at a high rate, and recognize only the occurrence of those changes in the conditions of its inputs between samples which satisfy rules provided by recipe generator 56. For this purpose, recipe generator 56 applies a mask signal on a line 68 to state transition detector 66 representing all of the permissible input condition changes permitted to produce interrupts. All other conditions are ignored by state transition detector 66. That is, if the conditions of all inputs to state transition detector 66 in one sample remain unchanged from their conditions in the preceding sample, then state transition detector 66 remains unresponsive. Also, if a change in conditions occurs which is not one those whose significance is certified by a mask signal from recipe generator 56 as requiring the generation of an interrupt in the present mode of operation, then state transition detector 66 remains unresponsive. State transition detector 66 produces an evaluate enable signal for connection on a line 70 to evaluator 64 only when a change occurs in its inputs between successive samples, and when the change exhibits a characteristic agreeing with the mask signal.

Modes of operation exist in X-ray imaging system 10 wherein, even though the change in conditions requiring an interrupt exist, the generation of such interrupt is preferably delayed until the completion of at least a portion of the current sequence of operations. As one example, if X-ray imaging is under way and a manual input is received changing the mode, it may be desirable to complete the steps required to obtain the image rather than to abort the partly-completed procedure. Other examples would occur to one skilled in the art. Recipe generator 56 applies a signal on a line 72 to evaluator 64 representing the desired condition which must be attained before an interrupt may be acted upon. Evaluator 64 compares the updated actual conditions on line 62 with the desired condition on line 72 looking for coincidence between the two. When such coincidence is found, evaluator 64 applies a control signal on a line 74 to recipe generator 56. In response to such control signal, recipe generator 56 either executes the current portion of the recipe or sets up the next recipe portion. To execute the current portion, recipe generator sends commands on lines 28, 30, 32, 47 and 34. To set up the next recipe portion it defines new masks 68 and desired conditions 72. The recipe portion may include, for example, a new set of operations to be performed at the completion of the interrupt procedure. Such new set of operations may include, for example, returning to the original recipe, branching to a different procedure, or terminating operations.

Figure 4:
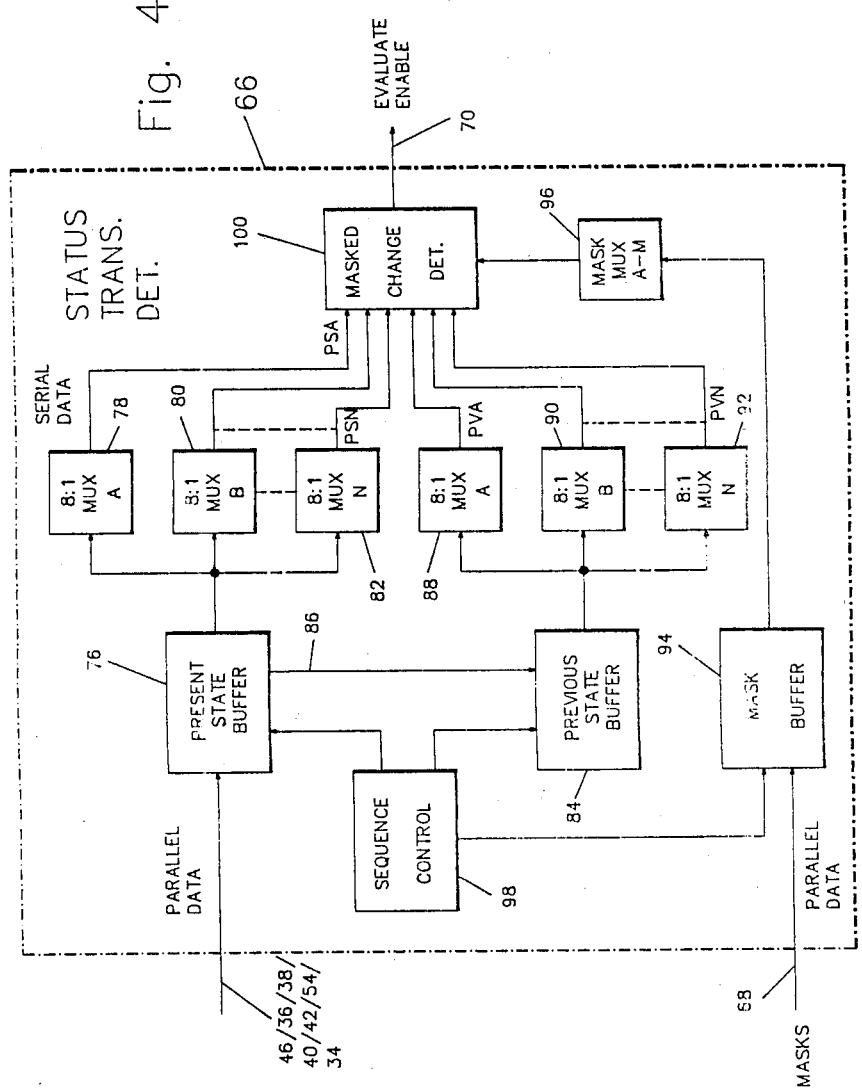
FIG. 4 is a block diagram of a state transition detector of FIG. 3.

Referring now to FIG. 4, state transition detector 66 contains a present state buffer 76 having sufficient storage for all binary digits in which state transition detector 66 may have an interest. In order to reduce the hardware required to test for a change in inputs without adding excessive delay in the processing, the binary digits of data in present state buffer 76 are presented in sets of, for example, eight binary digits to a plurality of multiplexers 78, 80 and 82. If, for example, the data in present state buffer 76 contains 24 binary digits, three sets of multiplexers 78-82 are provided to accept all 24 binary digits. In this case, N in FIG. 4 is equal to 3.

At an end of each sampling period, a previous state buffer 84 receives the contents of present state buffer 76 on a line 86. Previous state buffer 84 preferably contains the same capacity for binary digits as does present state buffer 76. Once latched into previous state buffer 84, the binary digits are presented in sets of eight to multiplexers 88, 90 and 92.

A mask buffer 94 receives parallel data from line 68 representing the masks relevant to the present operation. The binary digits in mask buffer 94 are presented in sets to a set of mask multiplexers 96. It will be noted that the number of set of mask multiplexers 96 is a value M which may differ from the number N of multiplexers in the sets 78-82 and 88-92.

A sequence controller 98 controls the transfer of data from present state buffer 76 to previous state buffer 84 and the latching of current data into present state buffer 76 as well as the latching of mask data into mask buffer 94.

At the beginning of the next sampling period, the then-present state of the data on the parallel input to present-state buffer 76 is latched into present state buffer 76 and presented to multiplexers 78-82.

Serial data is fed simultaneously from multiplexers 78-82, 88-92 and corresponding elements in set of mask multiplexers 96 to inputs of a masked change detector 100. If a change is detected in any input binary digit and, if not suppressed by the pattern of a mask from set of mask multiplexers 96, an evaluate enable signal is produced by masked change detector 100 and applied to line 70.

Figure 5:
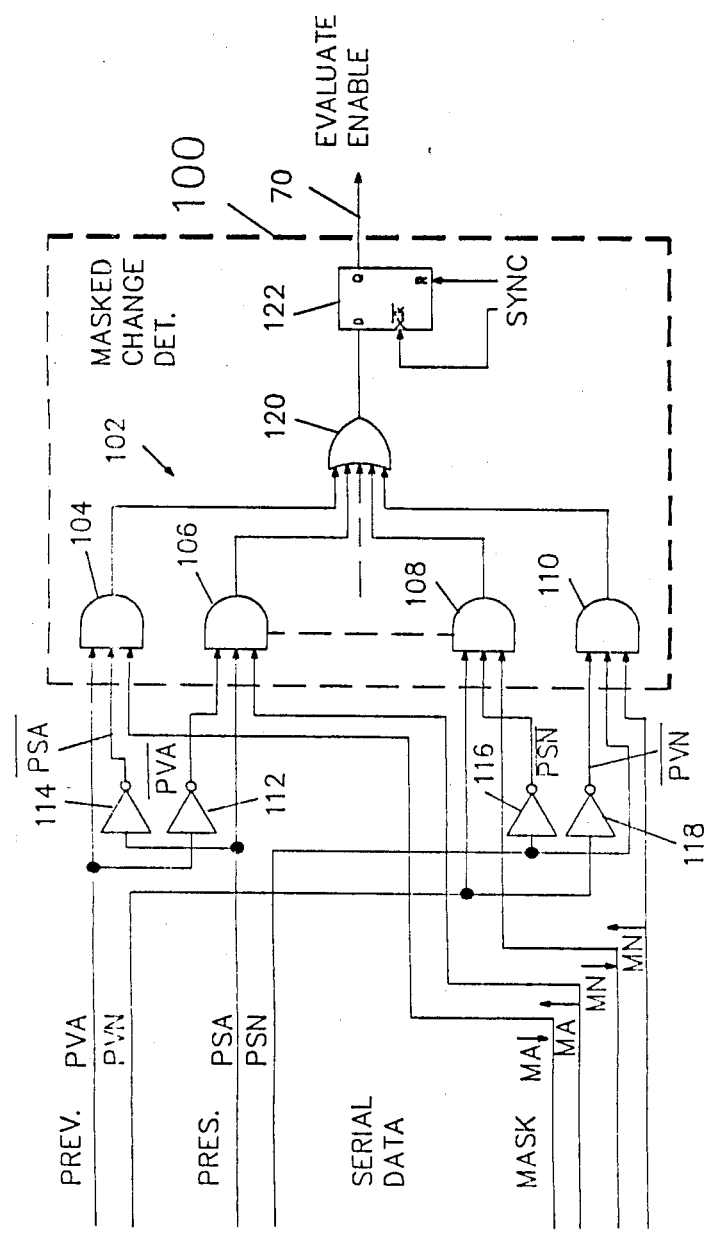
FIG. 5 is a block diagram of a masked change detector of FIG. 4.

Referring now also to FIG. 5, masked change detector 100 includes a logic array 102 having a plurality of AND gates 104, 106, 108 and 110 equal in number to the number of state changes which may be enabled by mask data. That is, at a given instant, mask data may enable the recognition of a change in the positive-going or negative-going directions while inhibiting the other, or it may inhibit or enable changes in both directions. The portion of the circuit shown in FIG. 5 is capable of enabling both positive-going and negative-going changes from the multiplexers 78 and 82 (FIG. 4). Other, unillustrated, portions of logic array 102 may contain only a single AND gate for recognizing a change in a single direction. Thus, the total number of AND gates in logic array 102 is between a maximum of twice the number of multiplexers for present or previous data and a minimum equal to the number of multiplexers.

Some types of signals such as, for example, timing signals, contain intelligence only when the change is in a predetermined direction. Changes in the opposite direction are ignored. One embodiment of the invention processes data from 16 parallel signal lines contain signals from which either positive- or negative-going changes must be recognizable and 8 parallel signal lines containing timing signals. Thus, a total of 40 changes (16 positive-going, 16 negative-going and 8 unidirectional). Assuming that 8:1 multiplexers are used throughout state transition detector 66 (FIG. 4), and that all of the timing signals are processed through one present-state and one previous-state multiplexer, the total number of AND gates in logic array 102 is 9 (8 for 4 channels of bi-directional change and 1 for one channel of unidirectional change). The values of N (FIG. 4) is 3 and the value of M is 5 in this example.

AND gate 104, if enabled by a mask signal, detects positive-going changes in the serial data streams of signal A from multiplexers 78 and 88 (FIG. 4) and gate 106, if enabled, detects negative-going changes in these signals. AND gates 108 and 110 perform the same functions for the positive- and negative-going changes in the serial data streams of signal N from multiplexers 82 and 92. The serial data stream from multiplexer 88 containing part of the previous-status information PVA is applied to one input of AND gate 104. The previous-status information on this line is inverted in an inverter 112 and applied to one input of AND gate 106. The present state information from multiplexer 78 is applied directly to one input of AND gate 106, and inverted in an inverter 114 for application to an input of AND gate 104. Mask data MA is applied to the third inputs of these AND gates. The arrows on the mask data lines indicate the direction of change enabled by each line. For example, the mask signal applied to the third input of AND gate 104 enables the recognition of a negative-going change in signal A. Similarly, the mask signal applied to the third input of AND gate 106 enables the recognition of a positive-going change in signal A. By way of example, a positive-going change requires that the previous condition is a 0 and the present condition is a 1. Thus, the inverted previous signal and the direct present signal applied to AND gate 106 are both 1. In the presence of an enabling mask signal of 1, AND gate 106 is enabled.

Similarly, AND gates 108 and 110, when enabled by mask signals, recognize negative-going and positive-going changes in the serial data streams from multiplexers 82 and 88.

The outputs of AND gates 104–110 are connected to inputs of an OR gate 120. The output of OR gate 120 is connected to the data input D of a D-type flip flop 122. A trigger signal is connected from a conventional timing circuit (not shown) to a clock input CLK of D-type flip flop 122 at a predetermined time. When triggered at its CLK input, a direct output Q of D-type flip flop 122 assumes the condition of the signal at its data input D. That is, if the signal at the data input D is a 1 when the CLK input is triggered, the direct output Q assumes the value 1 and remains in this condition until the next trigger signal is received. Thus, the signal on line 70 connected to the direct output Q of D-type flip flop 122 is driven by the trigger signal to equal the condition of the data input D of D-type flip flop 122. Once the signal on line 70 has accomplished its intended function of enabling an evaluation, a reset signal is applied to a reset input R of D-type flip flop 122 to return its direct output to 0.

It should be noted that the apparatus in state transition detector 66 and masked change detector 100 permits masked recognition of changes in parallel signals with a significant reduction in hardware as compared to that required if recognition of changes in every signal were performed in parallel. That is, to recognize 40 different signals, gating and latch circuits for all 40 signals are required. Converting the entire set of parallel signals to a single serial data stream requires a reduction in data-sampling rate which may not be acceptable. Instead, the present invention converts the set of parallel signals in sets of, for example, eight in 8:1 multiplexers. The outputs of the 8:1 multiplexers are then read out as parallel serial data streams. The amount of hardware logic is reduced significantly without imposing the full sampling-rate penalty attendant to operating on a single pair of serial data streams.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hybrid interrupt handler for an imaging system, said imaging system including at least one parallel data bus carrying a plurality of signals, comprising:
   an exposure-control module;
   said exposure-control module including means for storing at least one recipe defining an operating sequence of said imaging system;
   transition detection means responsive to a change in at least one of said plurality of signals for producing an evaluate enable signal; and
   comparison means responsive to said evaluate enable signal for comparing a desired condition specified by said recipe with an actual condition of said plurality of signals and for producing a control signal in response to coincidence between said desired and actual conditions.

2. A hybrid interrupt handler for an imaging system, said imaging system including at least one parallel data bus carrying a plurality of signals, comprising:
   an exposure-control module;
   said exposure-control module including means for storing at least one recipe defining an operating sequence of said imaging system;
   transition detection means responsive to a change in at least one of said plurality of signals for producing an evaluate enable signal;
   comparison means responsive to said evaluate enable signal for comparing a desired condition specified by said recipe with an actual condition of said plurality of signals and for producing a control signal in response to coincidence between said desired and actual conditions;
   said transition detection means includes:
   at least first and second multiplexers;
   means for storing first and second sample subsets of said plurality of signals taken at a first predetermined time in said at least first and second multiplexers;
   at least third and fourth multiplexers;
   means for storing third and fourth sample subsets of said plurality of signals taken at an earlier second predetermined time in said third and fourth multiplexers;
   said second predetermined time being a previous occurrence of said first predetermined sample time, whereby said third and fourth multiplexers contain signals equal to signals stored in said first and second multiplexers except for changes occurring between said first and second predetermined times;
   said comparision means including first means for comparing a first sequence of bits from said first multiplexer with a corresponding second sequence of bits from said third multiplexer;
   said comparison means further including second means for comparing a second sequence of bits from said second multiplexer with a corresponding fourth sequence of bits from said fourth multiplexer;
   said first means for comparing and said second means for comparing operating simultaneously; and
   logic means responsive to a difference between predetermined ones of said first and third and second and fourth sequences of bits for producing said evaluate enable signal.

3. A hybrid interrupt handler according to claim 2 wherein:
   said comparision means further includes at least first and second mask multiplexers;
   said at least one recipe including a plurality of mask bits stored in said first and second mask multiplexer said difference being a first difference wherein as positive-going change occurs and a second difference wherein a negative-going change occurs;

said logic means including first gating means receiving said first and third sequence of bits and a first sequence of mask bits from said first mask multiplexer, said first sequence of mask bits being effective selectively for inhibiting or enabling generation of said evaluate enable signal in response to said first or second difference beteween said first and second sequences of bits; and said logic means further including second gating means receiving said second and fourth sequences of bits and a second sequence of mask bits from said second mask multiplexer, said second sequence of mask bits being effective selectively for inhibiting or enabling generation of said evaluate enable signal in response to said first and second difference between said second and fourth sequences of bits.

4. A hybrid interrupt handler according to claim 3 wherein said logic means includes:

at least a first AND gate receiving said first sequence of bits, an inverse of said third sequence of bits, and said first sequence of mask bits; and at least a second AND gate receiving an inverse of said second sequence of bits, said fourth sequence of bits and said second sequence of mask bits.

5. A hybrid interrupt handler for an imaging system comprising:

an X-ray generator;

an X-ray receptor and patient handler;

an exposure-control module;

a parallel data bus connecting at least said X-ray receptor and patient handler to said exposure-control module;

said parallel data bus including means for carrying a plurality of signals;

said exposure-control module including means for storing at least one recipe defining an operating sequence of said imaging system;

transition detection means responsive to a change in at least one of said plurality of signals for producing an evaluate enable signal; and comparison means responsive to said evaluate enable signal for comparing a desired condition specified by said recipe with an actual condition of said plurality of signals and for producing a control signal in response to coincidence between said desired and actual conditions.

* * * * *